Figure 2:
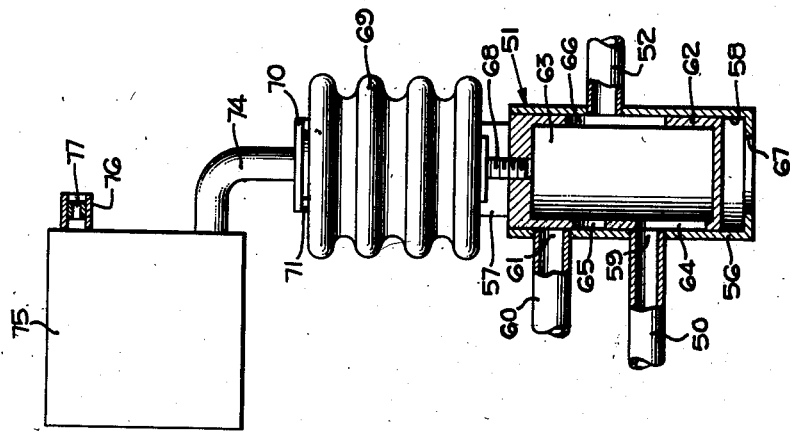

Jan. 12, 1954

J. M. KEMPER 2,665,623

ISOBARIC OVERRIDE CONTROL

Filed May 23, 1950

INVENTOR.
JAMES M. KEMPER
BY

ATTORNEY

Patented Jan. 12, 1954

2,665,623

UNITED STATES PATENT OFFICE 2,665,623

ISOBARIC OVERRIDE CONTROL

James M. Kemper, Hollywood, Calif., assignor to The Garrett Corporation, Los Angeles, Calif., a corporation of California Application May 23, 1950, Serial No. 163,768

20 Claims. (Cl. 98—1.5)

This invention relates generally to control devices, and relates more particularly to devices for controlling the pressure within an enclosure, such as for example, an aircraft cabin.

There are various known types of devices for regulating the ventilation and pressurization of an aircraft cabin. In one such type, disclosed in my Patent No. 2,463,491, the cabin pressure is maintained at atmospheric pressure as the plane ascends to a predetermined altitude, the so-called unpressurized range of flight. In this type of device, upon further ascent of the aircraft the cabin pressure is maintained at a substantially constant level between the first predetermined altitude and a second predetermined altitude, and this is the so-called isobaric range of flight. Upon further ascent of the aircraft above this second predetermined altitude, the cabin is maintained at a fixed differential pressure relative to the ambient atmospheric pressure, the so-called differential range of flight.

However, as modern high-speed aircraft may ascend or descend at an extremely rapid rate, it is highly possible that the rate-of-change of cabin pressure in any of these three ranges of flight may be so large as to cause extreme discomfort to the pilot and passengers. It is therefore an object of this invention to provide means to prevent an excessive rate-of-change of cabin pressure, and while this invention is adaptable to various types of aircraft cabin pressure control systems, it will be described with particular reference to the above described type.

Another object of the invention is to provide a novel arrangement and relationship of the control means controlling the pressure in the control pressure chamber of a pressure regulating mechanism.

Further objects and advantages of the invention will be brought out in the following part of the specification.

Figure 1:
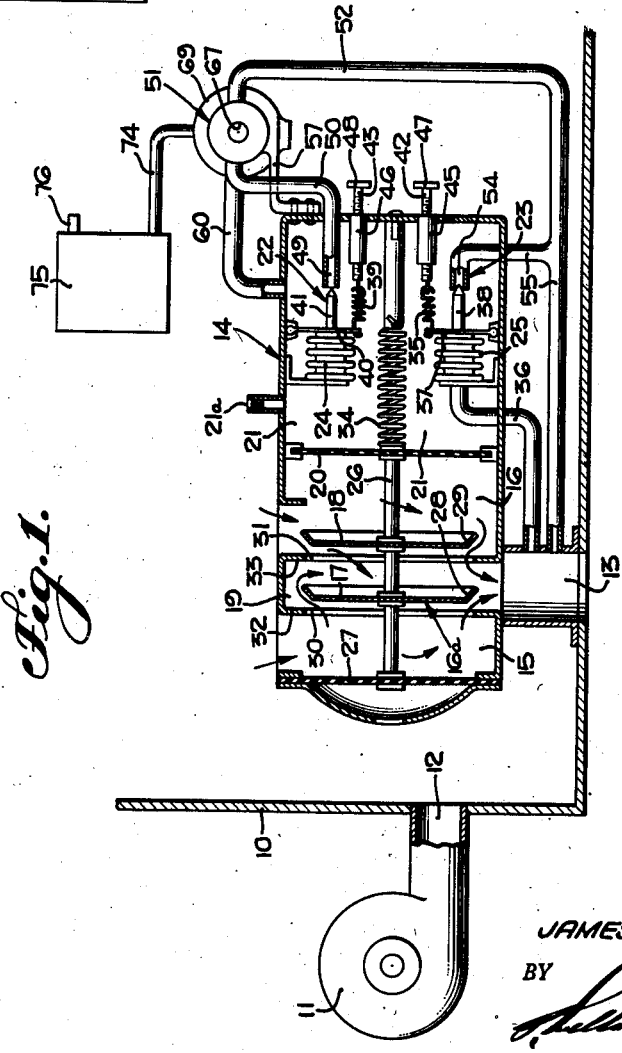

Referring to the drawings, which are for illustrative purposes only,

Fig. 1 is a schematic partial showing of a pressurized cabin having pressure control means embodying the present invention; and Fig. 2 is an enlarged view, partially in section, of the rate of change limiting means.

Referring to the drawings, reference numeral 10 indicates a partial showing of a pressurized aircraft cabin enclosure in which air under pressure is delivered to said cabin by a supercharger, conventionally indicated at 11, through a cabin inlet 12, and the pressure within the cabin 10 is controlled by controlling the escape of air from the cabin through an outlet 13 by means of a regulator unit 14.

The regulator 14 embodies spaced chambers 15 and 16 which provide paths for the flow of air from the cabin past balanced valve means 16a comprising members 17 and 18, into an intermediate chamber 19, from which it may escape to the outlet 13. The valve members 17 and 18 are of ample size to handle the outflow of air from the cabin under all operating conditions, and said valve members 17 and 18 are actuated by a pressure differential responsive means in the form of a diaphragm 20 which responds to the differential existing between cabin pressure, exerted against the left side thereof (as viewed in Fig. 1), and the pressure in a control chamber 21, exerted against the right side thereof. The chamber 21 has a restricted inlet bleed 21a connecting said chamber with a source of higher pressure which is shown as being the enclosure or cabin. The pressure in the chamber 21 in turn is controlled by either of the pilot valves 22 and 23 adapted to bleed air from the chamber 21, the valves 22 and 23 being actuated by pressure sensitive bellows 24 and 25 respectively.

The valve members 17 and 18 are mounted on a shaft 26 which in turn is fixed to and suspended between the diaphragms 20 and 27. As a result of this type of mounting, the movement of the valve members is of a floating character, substantially free from frictional resistance. The valve members are in the form of light sheet metal discs having very little inertia. The diaphragm 20 has a dashpot action with respect to chamber 21, and consequently, the valve members are not affected to any appreciable extent by maneuvering of the airplane. The valve members have frusto-conical rims 28, 29, adapted to co-act with the edges of circular openings 30, 31, in partition walls 32, 33, which edges define the valve seats.

Valve members 17 and 18 constitute a substantially balanced pair, and as such they are relatively unaffected by the pressure of air on either side of them or by the volume of flow of air therethrough, hence they offer little resistance except their own inertia to any impulse or change imparted to them by the diaphragm 20 through shaft 26.

Because of the light weight of the valve members 17 and 18, and the associated shaft 26, and because there are no other parts of the regulator 14 which depend for proper operation upon a certain positioning with reference to gravity, the unit may be installed in any position, with its axis disposed horizontally, vertically or angularly, and will, for all practical purposes, operate just as efficiently in one position as another.

It will be apparent that the regulator 14 correlates the cabin air efflux through the outlet 13 with the inflow from the supercharger 11 so as to maintain the desired cabin pressure.

The valve members 17 and 18 are urged toward closed position by the combined force of a compression spring 34 and the air pressure in the control chamber 21 exerted against the right side of diaphragm 20, and toward open position by the cabin air pressure exerted against the left side of diaphragm 20. The pressure in the chamber 21 is in turn controlled by the valves 22 and 23. The valve 23 normally is held closed by a spring 35 acting through the lever 37 and stem 38.

The pressurization of the cabin in the differential range of flight is governed by the differential bellows 25, one end of which is attached to lever 37. The internal surface of this bellows has atmospheric pressure transmitted to it from cabin outlet 13 by means of a tube 36. The external surface of the bellows is subjected to air pressure within the chamber 21.

Thus it will be seen that the pressure control means including the valve 23, spring 35, lever 37, stem 38, cooperating with opening 54, outlet tube 55, and bellows 25, constitute means responsive to the differential between control pressure in chamber 21 and atmospheric pressure for controlling, in the range, the pressure in the control chamber. The valve 22 normally is held open, against the force of a spring 39 acting through the lever 40 and stem 41, by the pressure in chamber 21 acting on the evacuated isobaric bellows 24. This pressure control means including the valve 22, spring 39, lever 40, stem 41, and bellows 24, constitutes a means responsive to the absolute pressure in the control chamber for additionally controlling the pressure within the control chamber, thus governing the pressurization of the cabin in the isobaric range of flight. The effective force on the respective springs 35 and 39 is controlled by adjustment means, each of which includes respective screws 42 and 43 attached to their respective springs and threaded through sleeves in the wall enclosing the chamber 21. The outer ends of the screws are threadably received in sleeves 45 and 46, and have knurled adjusting knobs 47 and 48.

These respective adjustment devices serve to adjust the force of springs 35 and 39 so as to preselect the altitudes at which the aircraft will enter the differential, isobaric and unpressurized flight ranges. Thus pre-flight adjustment of knob 48 predetermines the altitude at which the plane will leave the unpressurized range and enter the constant pressure isobaric range upon ascent of the plane, and vice versa upon descent. Pre-flight adjustment of knob 47 predetermines the altitude at which the plane will leave the isobaric range and enter the differential range of flight on further ascent and vice versa upon descent.

Referring now to Fig. 2, the rate of change limiting means comprises a valve, indicated generally at 51, having a tubular sleeve 56, one end of which is secured to a wall of the cabin (or other suitable support) by a fixture 57. A tube 50 communicates with the interior or bore 58 of said sleeve 56 by means of a port 59, the bore 58 also being connected to the chamber 21 by means of a tube 60 communicating with said bore through a port 61 which is spaced from the port 59 longitudinally of the sleeve 56. Within the bore 58 of the sleeve 56 is a plunger or valve member 62 adapted for sliding movement in said member 62. The plunger 62 is in the form of a hollow bore 58. The plunger 62 closed at both ends and with a space 63 disposed between said closed ends, said space communicating with a pair of ports 64 and 65 which are longitudinally aligned and spaced apart. The upper portion of the port 64 is adapted to register with the port 59 in the sleeve 56, so that the normal effective opening provided thereby is substantially the same as the normal effective size of the opening 49 of the valve 22, and the port 65 of the plunger is adapted to control the port 61 of said sleeve. A port 66 is provided in the plunger 62 and is of sufficient size as to permit free communication between the recess or space 63 and the tube 52 at all times within the operative range of movement of the plunger. In order to balance the plunger 62, the sleeve 56 is provided with an opening 67 which permits the passage of cabin air into the lower end of the tubular sleeve 56, the opposite end of the plunger also being exposed to cabin pressure.

The plunger 62 is shown as being threadably connected to a threaded stem 68 attached to the movable end of a bellows 69, the end of said bellows opposite the stem 68 being attached to a bracket 70 which in turn is secured to any convenient fixed support 71. It is to be understood, of course, that the stem 68 may be otherwise suitably connected to the plunger 62 so that movements of the movable end of the bellows will effect corresponding movements of said plunger 62.

The interior of the bellows 69 is connected, by means of a tube 74, with a tank or fluid reservoir 75 communicating with the interior of the cabin through a conduit 76 in which a restricted calibrated orifice 77 is provided. The tank 75 is desirable to provide a sufficient volume in the fluid circuit composed of bellows 69, tube 74, tank 75, and orifice 77, in order for a definite capacity lag to exist between the balancing of the pressure between the cabin and the fluid circuit and the balancing of the pressures between the cabin and chamber 21 through the agency of orifices 77 and 21a respectively. The proper lag is accomplished by calibrating the orifice 77 with respect to the volume of the fluid circuit and the size of orifice 21a. However, by proper design of the bellows 69, the tank 75 and tube 74 may be eliminated, tube 76 with associated orifice 77 then being connected directly to the bellows 69.

From the foregoing it will be apparent that the rate of change control means is arranged to operate in series and in parallel with the isobaric control means and operates in parallel with the differential control means.

*Operation*

The operation of regulator 14 per se will be only briefly touched on herein, sufficiently to make clear the operation and function of the rate-of-change control valve 51.

In the unpressurized range of operation the air flows into the cabin from the supercharger, pressure being built up inside the cabin only to approximately 0.5″ Hg or less. The isobaric bellows is compressed in the unpressurized range of operation and the valve 22 is therefore held open, allowing the small quantity of air entering the control chamber 21 through orifice 21a to discharge through the valve 22, tube 50, ports 59 and 64, recess 63 and tube 52, thence to the atmosphere. Pressure is thereby prevented from building up within the control chamber. Cabin pressure acting on the external side of the diaphragm 20 overcomes the force of the diaphragm spring 34 and opens the outflow valves 17 and 18, allowing air to flow from the cabin to atmosphere. Within this range of flight the pressure in the chamber 21 is substantially that of atmosphere, which of course is an inverse function of the altitude of the aircraft.

As the aircraft ascends into the isobaric range the pressure of the atmosphere (and therefore the pressure within the control chamber) becomes less, thus expanding the isobaric bellows 24. This expansion, augmented by the isobaric spring 39, tends to close the valve 22, thus closing off the atmosphere vent from the control chamber. This permits pressure to build up inside the control chamber, allowing the spring 34 to move the valves 17 and 18 to a closed position. Any increase in the control chamber pressure would cause the isobaric bellows to contract, thus opening the valve 22 and subsequently reducing the control chamber pressure. This permits cabin pressure, acting on the external side of the diaphragm 20 to open the valves 17 and 18 sufficiently to reduce pressure within the cabin the desired amount, thereby maintaining a constant cabin altitude through the isobaric range. Within this range of flight the pressure in the control chamber 21 is substantially equal to that of the first predetermined altitude at which the aircraft entered the isobaric range, less the pressure equivalent of the force of the diaphragm spring 34, and subject, of course, to minute modulation by the isobaric bellows in accordance with any changes in cabin pressure due to variations in output by the supercharger.

As the aircraft ascends still further into the differential range of flight, cabin air bleeds into the control chamber as before. However, as the altitude is increased the differential pressure between the regulator, control chamber 21, and that of the outlet 13 is increased. The interior of the differential bellows 25 will have it pressure decreased due to the tube 36 venting to atmosphere.

As the differential increases, the bellows 25, resisted by the force of spring 35, will be contracted, thus opening the valve 23 and allowing air to bleed from the control chamber 21 to the atmosphere through the opening 54 and tube 55, and thus reducing pressure in the chamber allowing the valve means 16a to open, thereby regulating the cabin pressure so as to maintain a constant differential pressure over atmospheric pressure.

If we assume the aircraft to be ascending at a rate at which normal regulation of cabin pressure by the regulator 14 might cause physical discomfort or distress to pilot and passengers by decompression, the rate-of-change valve would function as follows:

The rapid rate of lowering of the cabin pressure would cause bellows 69 to expand since the rapid rate of lowering of the pressure would not be as quickly communicated to the inside of the bellows due to the restricting action of orifice 77. The expansion of bellows 69 would be transmitted as downward movement of stem 68 which in turn would be transmitted to plunger 62. The downward movement of plunger 62 would result in a closing of the communication between ports 59 and 64.

Since these ports 59 and 64 form the outlet for bleed air from chamber 21 through valve 22 to tube 52 and thence to atmosphere, it is apparent that a pressure would build up in chamber 21 which would move the outflow valve members 17 and 18 in the closing direction by the increased control chamber pressure exerted on diaphragm 20. Thus, cabin pressure would tend to decrease at a slower rate than would normally occur through the action of the regulator 14 without the override by the rate-of-change control valve 51.

If we now assume the aircraft to be descending at a rapid rate, as for instance in a dive, and in which case a too rapid build-up of cabin pressure might ensue by normal regulation of cabin pressure by regulator 14, such as to cause uncomfortable or distressing compression of pilot and passengers, the rate-of-change control valve would prevent too rapid an increase in cabin pressure from its normal position, as follows:

The rapid rate of rise of cabin pressure would cause contraction of bellows 69 since the pressure inside the bellows would not be increased at a corresponding rate due to the restricting action of orifice 77. This contraction of the bellows is transmitted to plunger 62 as an upward movement which partially uncovers port 61 to communicate with recess 63 and tube 52 through the port 65. The uncovering of port 61 allows air in chamber 21 to escape through tube 60, ports 61 and 65, recess 63 and tube 52 to atmosphere, thus resulting in a reduction of the pressure in chamber 21. The reduction of pressure in chamber 21 causes an opening movement of valve members 17 and 18 which would cause increased airflow from the cabin, and hence would cause cabin pressure to increase at a lower rate than would normally be the case of the action of regulator 14 were without the overriding effect of the rate-of-change control valve.

I claim:

1. In mechanism for controlling pressure within an enclosure: walls defining a control pressure chamber; a movable pressure sensitive control element subjected on one side to enclosure pressure and on the other side to control chamber pressure; pressure control means for said control chamber, including pressure responsive means having one side subjected to control chamber pressure and adapted to control the pressure in said chamber; and rate of pressure change control means, including a pressure responsive element, said rate of pressure change control means being arranged in series with the first mentioned pressure responsive means.

2. In mechanism for controlling pressure within an enclosure: walls defining a control pressure chamber; a movable pressure sensitive control element subjected on one side to enclosure pressure and on the other side to control chamber pressure; pressure control means for said control chamber, including pressure responsive means having one side subjected to control chamber pressure and adapted to control the pressure in said chamber; and rate of pressure change control means operably arranged in series and in parallel with respect to the pressure responsive means, said rate of pressure change control means including pressure responsive means.

3. In mechanism for controlling the pressure within an enclosure: walls defining a control pressure chamber; a movable pressure sensitive control element subjected on one side to enclosure pressure and on the other side to control chamber pressure; pressure control means for said control chamber, including pressure responsive means having one side subjected to control chamber pressure and adapted to control the pressure in said chamber; and rate of pressure change control means for said control chamber arranged in series with said pressure responsive means, said rate of pressure change control means including a pressure responsive device subjected to enclosure pressure.

4. In mechanism for controlling the pressure within an enclosure: walls defining a control pressure chamber; a movable pressure sensitive control element subjected on one side to enclosure pressure and on the other side to control chamber pressure; pressure control means for said control chamber, including pressure responsive means having one side subjected to control chamber pressure and adapted to control the pressure in said chamber; and rate of pressure change control means for said control chamber arranged in series and in parallel with said pressure responsive means, said rate of pressure change control means including a pressure responsive device subjected to enclosure pressure.

5. In mechanism for controlling the pressure within an enclosure: walls defining a control pressure chamber; a movable pressure sensitive control element subjected on one side to enclosure pressure and on the other side to control chamber pressure; pressure control means for said control chamber, including absolute pressure responsive means subjected to control chamber pressure and adapted to control the flow of fluid relative to said chamber; and rate of pressure change control means operably arranged in series with said absolute pressure responsive means, said rate of pressure change control means controlling the flow of fluid relative to said control chamber and having a pressure responsive device subjected on one side to enclosure pressure.

6. The invention defined by claim 5, including a differential pressure responsive means for controlling the flow of fluid relative to said control chamber, said differential pressure responsive means being responsive to the differential of pressure between that in the control chamber and pressure exteriorly of the enclosure, said rate of pressure change control means being arranged to operate in parallel with respect to both the absolute pressure responsive means and the differential pressure responsive means.

7. In mechanism for controlling the pressure in an enclosure: means defining a control pressure chamber; a movable pressure sensitive control element responsive to the differential of pressure between that existing in the enclosure and that in said control chamber; absolute pressure responsive means, responsive to control chamber pressure for maintaining a substantially constant pressure in said control chamber; a connection between the control chamber and a region of pressure lower than that in the control chamber; means controlling said connection; a device responsive to the pressures on opposite sides thereof for controlling the last mentioned means, one side of said device being subjected to enclosure pressure; means, including a restriction, connecting the opposite side of said device to said enclosure pressure; and a fluid reservoir interposed between said restriction and said device.

8. Mechanism for controlling the pressure in a pressurized cabin, comprising: an adjustable cabin outlet valve; means defining a control pressure chamber; means controlling said outlet valve, said means being responsive to the differential of pressure between that existing in the cabin and said control chamber; a rate of change control valve having a pair of connections with the control chamber and a connection with the atmosphere; absolute pressure responsive means, including a valve element and a pressure responsive device responsive to control chamber pressure for controlling one of the connections between the rate of change control valve and the control chamber, said rate of change control valve having ports controlling the connections with the control chamber, the port for the connection controlled by said valve element being so arranged that the effective area thereof is normally substantially the same as the effective area of the opening controlled by said valve element, the other connection with the chamber being normally closed and the connection with atmosphere being open at all times; and a device responsive to the pressures on opposite sides thereof for controlling the rate of change control valve, one side of said device being subjected to cabin pressure, and the other side of said device having a restricted connection with said cabin pressure.

9. The invention defined by claim 8, wherein the rate of change control valve is a balanced valve.

10. Mechanism for controlling the pressure in an enclosure, comprising: means for controlling the flow of fluid relative to said enclosure, including a pressure responsive element subjected on one side to enclosure pressure; means defining a control pressure chamber, the other side of said element being subjected to the pressure in said control chamber; differential pressure responsive means responsive to the differential between control chamber pressure and a variable pressure for maintaining the pressure in said control at a substantially constant differential relative to said variable pressure; and rate of change control means for limiting the rate of pressure change within the enclosure including a rate of change control valve having a pair of connections with the control chamber and a connection with a region of lower pressure, one of said connections with the chamber being normally open, and the other of said connections being normally closed; means responsive to the pressures on opposite sides thereof for controlling the rate of change control valve, one side of said means being subjected to enclosure pressure; and restricted means for connecting the other side of said means to enclosure pressure.

11. The invention defined by claim 3, wherein there is a fluid reservoir interposed between the restriction and said opposite side of the means controlling the rate of change control valve.

12. Mechanism for controlling the pressure in an enclosure, comprising: means for controlling the flow of fluid relative to said enclosure, including a pressure sensitive element; means defining a control pressure chamber having an inlet connection with a region of higher pressure; a rate of pressure change control valve having a pair of connections with the control chamber and a connection with the pressure exteriorly of the enclosure, said connections providing outlet means for fluid in the control chamber, said valve having a valve element for controlling the connections with the control chamber in such a manner that one of said connections is normally open and the other is normally closed, the connection with the exterior of the enclosure being open at all times; a device responsive to variations in the differential of pressures on opposite sides thereof for controlling the valve member, one side of said device being subjected to pressure in the enclosure; restrictive means connecting the other side of the device with said enclosure; absolute pressure responsive means for controlling the normally open connection between said valve and control chamber; and differential pressure responsive means for controlling the flow of fluid relative to said control chamber independently of the absolute pressure responsive means and the rate of pressure change control means, said differential pressure responsive means being subjected on one side to pressure in the control chamber and on the opposite side to pressure exteriorly of the enclosure.

13. In mechanism for controlling the pressure within an enclosure: walls defining a control pressure chamber; a movable pressure sensitive control element subjected on one side to enclosure pressure and on the other side to control chamber pressure; pressure control means for said control chamber, including pressure responsive means having one side subjected to control chamber pressure and adapted to control the pressure in said chamber, said pressure responsive means normally constituting the sole chamber pressure control means in one range of operation; and rate of pressure change control means pneumatically arranged in parallel with said pressure responsive means, said rate of pressure change control means including pressure responsive means.

14. In mechanism for controlling the pressure within an enclosure: walls defining a control pressure chamber; a movable pressure sensitive control element subjected on one side to enclosure pressure and on the other side to control chamber pressure; pressure control means for said control chamber, including pressure responsive means having one side subjected to control chamber pressure and adapted to control the pressure in said chamber, said pressure responsive means constituting the sole pressure control means for said control chamber under normal conditions in one range of operation; and rate of pressure change control means for said control chamber arranged in parallel with said pressure responsive means, said rate of pressure change control means including a pressure responsive device subjected to enclosure pressure.

15. In mechanism for controlling the pressure within an enclosure: means defining a control pressure chamber; a movable pressure sensitive element responsive to variations in the differential of pressure between that existing in the enclosure and that in said control chamber; absolute pressure responsive means, responsive to control chamber pressure for maintaining a substantially constant pressure in said control chamber; a connection between the control chamber and a region of pressure of a value different from that in the control chamber; means controlling said connection; a device responsive to differential of pressures on opposite sides thereof for controlling the last mentioned means, one side of said device being subjected to a pressure to be controlled; and restricted means connecting the opposite side of said device with the enclosure.

16. In means for controlling the pressure in the control chamber of pressure regulating mechanism, said control chamber having an inlet connection and an outlet connection: pressure control means for controlling the flow through one of said connections, said pressure control means including an absolute pressure responsive device; and a rate of pressure change control means interposed in said one connection and adapted to control the flow through said connection, said rate of pressure change control means also having a connection with the control chamber arranged in parallel with said one connection.

17. In means for controlling the pressure in the control chamber of a pressure regulating mechanism, said control chamber having an inlet connection and an outlet connection: pressure control means for controlling one of said connections, said pressure control means including an absolute pressure responsive device; a differential pressure responsive means for controlling the flow of fluid relative to said control chamber; and rate of pressure change control means having a valve member interposed in said one connection for controlling the flow of fluid through said connection, said rate of pressure change control means including a connection with the chamber arranged in parallel with said one connection and also arranged in parallel with respect to the flow of fluid controlled by the differential pressure responsive means.

18. In mechanism for controlling the pressure within an enclosure: walls defining a control pressure chamber; rate of pressure change control means including a valve having a connection with a region of pressure different from that in the control chamber and a pair of connections with said control chamber; pressure responsive means for controlling said valve; and other pressure responsive means, operable independently of the first mentioned pressure responsive means, for controlling one of said connections with the control chamber.

19. In mechanism for controlling the pressure within an enclosure: walls defining a control pressure chamber; a movable pressure sensitive control element subjected on one side to enclosure pressure and on the other side to control chamber pressure; pressure control means for said control chamber, including pressure responsive means having one side subjected to control chamber pressure and adapted to control the pressure in said chamber; and rate of pressure change control means for said control chamber, said rate of pressure change control means including a pressure responsive device subjected to enclosure pressure.

20. In mechanism for controlling the pressure in an enclosure: means defining a control pressure chamber; a movable pressure sensitive control element responsive to the differential of pressure between that existing in the enclosure and that in said control chamber; independently operable absolute pressure responshive means, responsive to control chamber pressure for maintaining a substantially constant pressure in said control chamber; a connection between the control chamber and a region of pressure lower than that in the control chamber; means controlling said connection; a device responsive to the pressures on opposite sides thereof for controlling the last mentioned means, one side of said device being subjected to enclosure pressure; means, including a restriction, connecting the opposite side of said device to said enclosure pressure; and a fluid reservoir interposed between said restriction and said device.

JAMES M. KEMPER.

References Cited in the file of this patent

UNITED STATES PATENTS

| Number | Name | Date |
|---|---|---|
| 2,307,199 | Cooper | Jan. 5, 1943 |
| 2,396,116 | Noxon | Mar. 5, 1946 |
| 2,413,027 | Maxson | Dec. 24, 1946 |
| 2,441,592 | Paget | May 18, 1948 |
| 2,463,487 | Widgery et al. | Mar. 1, 1949 |
| 2,463,489 | Kemper | Mar. 1, 1949 |
| 2,510,976 | Herrala et al. | June 13, 1950 |
| 2,513,332 | Kemper | July 4, 1950 |
| 2,549,690 | Klemperer | Apr. 17, 1951 |
| 2,620,719 | Price | Dec. 9, 1952 |

FOREIGN PATENTS

| Number | Country | Date |
|---|---|---|
| 521,623 | Great Britain | May 27, 1940 |